United States Patent [19]

Sherard

[11] Patent Number: 4,630,394
[45] Date of Patent: Dec. 23, 1986

[54] SUBIRRIGATION GRAVEL CULTURE GROWING BED

[76] Inventor: Michael W. Sherard, 25801 128th Pl. S.E., Kent, Wash. 98031

[21] Appl. No.: 650,696
[22] Filed: Sep. 17, 1984
[51] Int. Cl.⁴ ............................................. A01G 31/00
[52] U.S. Cl. ............................................ 47/59; 47/18
[58] Field of Search ................. 47/18, 59, 62, 63, 64, 47/79, 80, 81, 82

[56] References Cited

U.S. PATENT DOCUMENTS

| | | | |
|---|---|---|---|
| 460,809 | 10/1891 | Gunther | 47/59 X |
| 1,022,616 | 4/1912 | Winandy | 47/18 |
| 2,278,991 | 4/1942 | Hasslacher et al. | 47/79 X |
| 2,491,271 | 12/1949 | King | 47/18 |
| 3,365,840 | 1/1968 | Cooper | 47/82 |
| 3,728,254 | 4/1973 | Carothers | 47/62 X |
| 4,185,414 | 1/1980 | Miller | 47/62 |
| 4,211,034 | 7/1980 | Piesner | 47/62 |
| 4,255,896 | 3/1981 | Carl | 47/62 |
| 4,310,990 | 1/1982 | Payne | 47/59 |
| 4,324,069 | 4/1982 | Flagg | 47/62 |

FOREIGN PATENT DOCUMENTS 988241 1/1983 U.S.S.R. ................................. 47/62

*Primary Examiner*—F. Barry Shay
*Attorney, Agent, or Firm*—Delbert J. Barnard

[57] ABSTRACT

One problem which occurs in hydroponic growing systems is that pools of water form in the bottom of the growing bed container. These pools become depleted of oxygen very rapidly and if the plant roots extend into the pools the plants may die. This problem is solved by a false bottom (34, 54) in the growing bed container (10, 10'), so that any pooling which may occur occurs below the false bottom (34, 54). Pooling on the false bottom (34, 56) is prevented by the constructed of the false bottom (34, 56). The false bottom (34) either has a convex upper side, so that pooling cannot occur on the false bottom (34). Drainage openings (36) are provided at the two edges of the false bottom (34), so that any solution flowing towards the edges will flow through the openings (36) into the space below the false bottom (34). Or, the false bottom (56) is a sheet of formanous fabric material (56) which lies over a layer of gravel (54). During drainage the solution passes downwardly through the material (56) into the gravel (54) containing space below the material (56). No pooling can occur on the fabric material (56).

10 Claims, 5 Drawing Figures

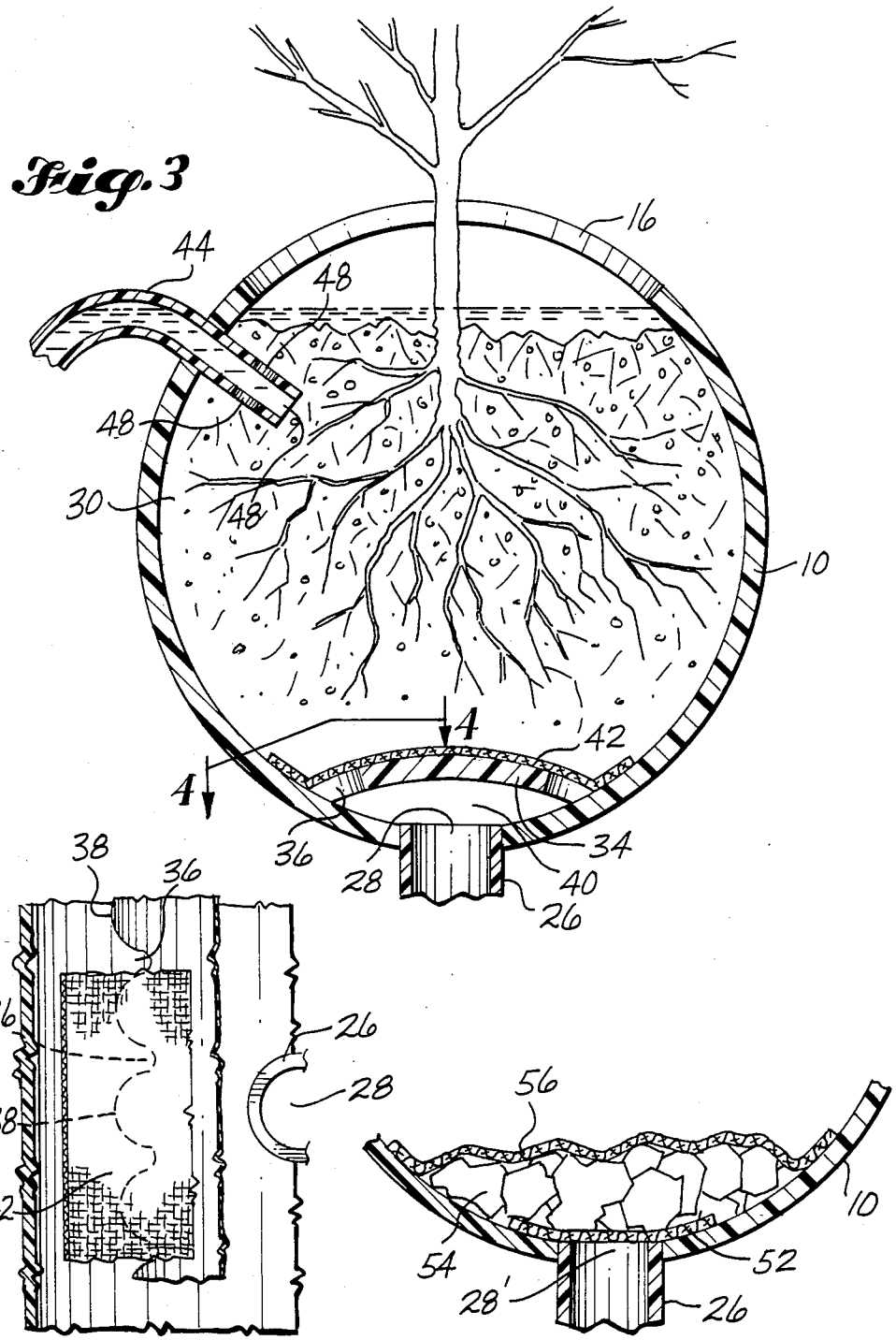

SUBIRRIGATION GRAVEL CULTURE GROWING BED

DESCRIPTION

1. Technical Field

The present invention relates to hydroponic growing systems, and in particular to the provision of an improved gravel bed container having a false bottom arranged to prevent pooling of water/nutrient solution in the growing bed space.

2. Background Information

A subirrigation gravel growing bed comprises a container, a bed of gravel within the container in which plants are grown, and inlet/outlet means in the bottom of the container. A water/nutrient solution is pumped into the inlet/outlet so that it will rise in the gravel bed up to a predetermined level. Then the pump is turned off and the solution is allowed to drain out through the inlet/outlet back to a reservoir. As the water drains out, fresh air containing oxygen is drawn down into the gravel bed and a film of nutrient is left on the gravel particles.

Only a film of moisture on the gravel particles is desired. If puddles of solution remain in the bottom of the plant bed, poor plant growth results. Pools of solution become depleted of oxygen very rapidly and if the plant roots are allowed to grow into these pools the plant growth is adversely affected and over a period of time the plants may die.

Hydroponic systems which exist in the patent literature and which include growing bed containers constructed from lengths of plastic tubing are disclosed by the following U.S. Pat. Nos. 4,185,414, granted Jan. 29, 1980, to William M. Miller; 4,211,034, granted July 8, 1980, to Barry J. Piesner; 4,255,896, granted Mar. 17, 1981, to Vincent P. Carl; and 4,310,990, granted Jan. 19, 1982, to Robert L. Payne. These patents should be carefully studied for the purpose of putting the present invention into proper perspective with respect to the prior art.

DISCLOSURE OF THE INVENTION

According to the present invention, a growing bed defining container is provided which includes a false bottom. The false bottom is located in the container above the container bottom, so as to define a space below the false bottom. The false bottom includes openings for allowing solution to flow between the spaces above and below the false bottom. The gravel bed is located above the false bottom and is constructed to prevent pooling on the false bottom. Water/nutrient solution intoduced into the space below the false bottom will flow upwardly through the openings in the false bottom into the gravel growing bed. During drainage, the solution flows back through the openings into the space below the false bottom. Any pooling of solution which may occur will occur in the bottom of the container below the false bottom.

According to one aspect of the invention, the false bottom is a strip of plastic material having side edge portions which contact opposite bottom side portions of the container. The plastic materal includes openings which communicate the space below the false bottom with the space above the false bottom.

According to another aspect of the invention, the opposite edge portions of the plastic strip material are notched at spaced intervals and the notches provide the openings which connect the space below the false bottom with the space above the false bottom.

In accordance with yet another aspect of the invention, the false bottom is convex at its top and concave at its bottom, so that no solution will puddle on the central portion of the false bottom.

In accordance with another aspect of the invention, the false bottom exists in the form of a sheet of foraminous fabric overlying a layer of gravel which sets on the bottom of the container. The fabric material includes openings which allows water/nutrient solution to flow both upwardly and downwardly through the material. Pooling cannot occur on the fabric material and any pooling which exists in the container below the fabric material is maintained out of contact with the plant roots by the fabric material.

In accordance with yet another aspect of the invention, the growing bed container is formed from a length of plastic tubing closed at its ends, and said length of plastic tubing is supported in an elevated position by the use of a plurality of spaced apart concrete building blocks, set on end. The concrete building blocks have end recesses down into which portions of the plastic tubing are placed. The recesses are bordered by rough concrete edges which bite into and grip the plastic tubing, and effectively prevent the tubing from either rotating in position or moving endwise in position.

Other more detailed features of the invention are described in the description of the preferred embodiment and are particularly pointed out in the appended claims.

BRIEF DESCRIPTION OF THE DRAWINGS

In the drawings, like element designations refer to like parts throughout, and:

FIG. 3 is an enlarged scale cross-sectional view of a first embodiment of the growing bed forming tube, showing a false bottom inside the tube below the bed of gravel;

FIG. 4 is a fragmentary view, partially in section and partially in plan, showing the construction of an edge portion of the false bottom and its contact with a sidewall of the tubing; and FIG. 5 is a fragmentary view of the lower portion of a growing bed forming tube, showing a modified way of constructing the false bottom.

BEST MODES FOR CARRYING OUT THE INVENTION

Figure 1:
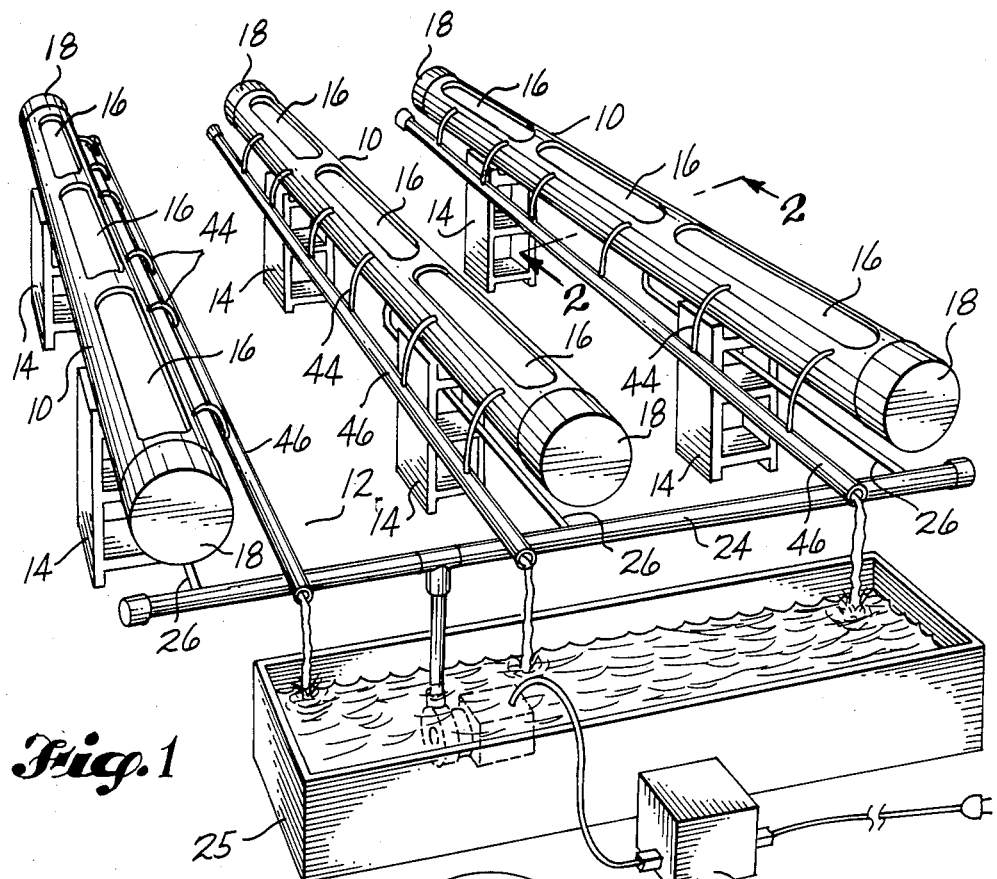
FIG. 1 is a fragmentary perspective view of a hydrophonic growing apparatus embodying the present invention.
Figure 2:
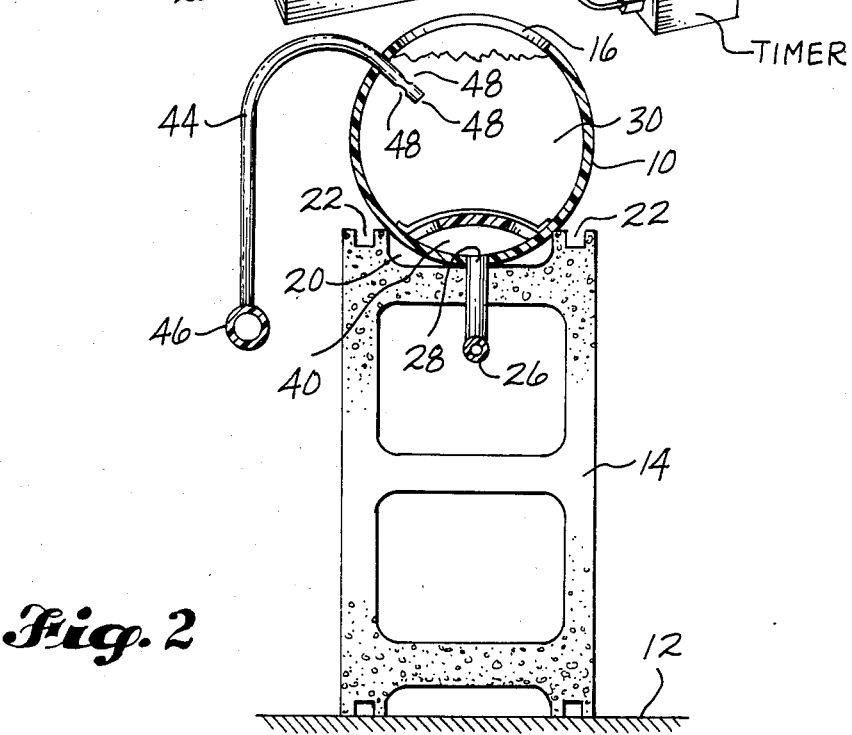
FIG. 2 is an elevational view showing the use of a concrete building block standing on end and serving as a support leg for a growing bed forming tube.

FIG. 1 shows a plurality of growing bed forming tubes 10 elevated above a floor or ground surface 12 by means of the use of a plurality of spaced apart concrete building blocks 14.

In a typical installation, a plurality of growing bed forming tubes 10 are spaced apart in a growing space, to provide a plurality of parallel growing rows. The tubes 10 are preferably lengths of plastic (e.g. PVC) pipe. In a typical installation, six inch diameter pipe is used. Slots 16 are cut into the upper portions of the pipes 10, to provide upwardly open growing regions within the pipes 10. The pipes 10 may be closed at their ends by use of plastic end caps 18.

The concrete building blocks 14 provide a very easy but effective and inexpensive way of supporting the pipes 10. The concrete blocks 14 measure eight inches by eight inches by sixteen inches. The blocks 14 are set on end. The end that is directed upwardly includes an end recess formed between two end portions 22. Concrete building blocks 14 have rough surfaces. As a result, when a length of tubing 10 is set down onto a pair of spaced apart blocks 14, with portions of the tubing 10 set into the end recesses 20, contact is made between wall portions of the tubing 10 and corner edges formed where the recess 20 meets the end portions 22. The rough concrete at these edges grips the plastic pipe 10 and keeps it from rotating or moving endwise relative to the blocks 14. The use of a sixteen inch block 14 places the tubes 10 at a very usable height above the ground.

As is well-known, hydroponic growing involves the growing of plants in beds of gravel. Seeds or starter plants are spaced apart in the growing bed. Water containing a nutrient for the plant is introduced into the gravel and then allowed to drain out, leaving a film of nutrient on the plant roots and the gravel surrounding the plant roots.

The subject system is a subirrigation system. This means that the water containing the nutrient is introduced through the bottom of the bed. Referring to FIG. 1, a manifold 24 is provided at one end of the growing space. Pipes 26 extend from manifold 24 to central bottom portions of the pipe 10. Water (e.g. from a reservoir 25) containing the nutrient is pumped into the manifold 24 and flows from manifold 24 through the pipes 26 and inlet/outlet ports 28, into the lower portions of the growing tubes 10. The water/nutrient solution is pumped at such a rate that the level of the solution will rise in the gravel bed 30. Once the solution reaches the upper regions of the pipes 10, the pump is turned off and the solution is allowed to drain back through the inlet/outlet ports 28 and the pipes 26 into the manifold 24. As the water drains out fresh air containing oxygen is drawn in through the top openings 16 and a film of nutrient is left on the plant roots and on the gravel.

Only a film of moisture on the gravel is desired. If puddles of solution were to remain on the bottom of the plant bed, poor plant growth would result and the plants might die.

A principal aspect of the present invention is to provide for complete drainage of the solution away from the plant roots.

According to the invention, the growing tubes 10 are provided with false bottoms so that if any puddles remain in the pipes 10 they will be below the level of the false bottom. In this manner, the roots of the plants are isolated from any puddles which might exist.

Referring to FIG. 3, a first form of false bottom 34 comprises a strip of plastic material having opposite edges cut or otherwise formed to provide passageways. By way of typical example, each false bottom 34 may be a sidewall strip cut from the same type of pipe used for the growing beds 10.

FIGS. 3 and 4 disclose an example construction of the edges of the false bottom 34. This construction involves the formation of spaced apart notches 36 in the edges, leaving projections 38 between the notches 36. The false bottom strip 34 is set down into the bottom of the pipe 10, with its convex side directed upwardly. The projections 38 contact the bottom or valley of the pipe.

The notches 36 provide avenues communicating the space 40 below false bottom 34 with the gravel containing space above the false bottom 34. Preferably, a foraminous fabric strip 42 (e.g. nylon organdy) is placed over the false bottom 34. The fabric material 42 allows the nutrient/water solution to pass through its pores or openings quite easily, but prevents the gravel in gravel bed 30 from plugging the openings 36.

In use, the water/nutrient solution is pumped into the pipes 10 through the ports 28. The solution enters the space 40 and quickly flows lengthwise through the space. Next, the solution flows through the openings 36 into the space above the false bottom 34. It continues to rise in the space until either the pump is turned off or the level of inlet openings 48 into overflow pipes 44 are reached, whichever occurs first. The overflow pipes pick up whatever overflow may occur and delivers it to return pipes 46. The return pipes 46 empty into the reservoir 25 from which the solution was pumped.

When the pump is turned off, the solution within the pipes 10 drains out through the opens 36 and the inlet/outlet ports 28. As will be apparent, if there are any puddles in the lower part of the pipe 10, they will be below the false bottom 34. As previously mentioned, the false bottom 34 blocks the plant roots 32 from entering into whatever puddles might exist.

The use of the false bottom 34 also provides a quite simple yet effective way of flow distribution. The first flow into the space 40 finds it easier to flow along the length of space 40 than to flow up and through the openings 36. This is because of gravity acting to hold the solution down and the open nature of the space below the false bottom and its relatively large size in comparison with the openings 36. Thus, the solution first fills space 40 and then flows upwardly through the openings 36, substantially uniformly along the full length of the tube 10.

FIG. 5 discloses what may be a less expensive way of constructing a false bottom. A screen or other foraminous sheet of material 52 is provided on the bottom of each pipe 10, immediately over the outlet port 28'. A layer of gravel 54 (e.g. three quarters of an inch crushed gravel) is placed in the bottoms of the tubes 10 and then a foraminous fabric 56 is layed over the gravel 54 and at its edges is cemented to the plastic pipe 10. The spaces between the pieces of gravel 52 form a region in which any puddling that might occur will occur. The fabric layer 54 prevents the plant root 32 from growing down into the region below the fabric layer 54.

The concrete blocks 14 elevate the tubes 10, so that gravity return of the water/nutrient solution is possible. In commercial systems, either in greenhouses or out of doors, where the system is built on the ground, it only becomes necessary to level the ground below each concrete block. As a result, the set up time is low and the set up procedure is quite simple. The edges of the concrete material which contact the side surfaces of the tubing "bite" into the tubing and hold it securely in place.

What is claimed is:
1. A subirrigation gravel growing bed comprising:
an elongated, open top, growing bed container having a laterally concave bottom;
an elongated false bottom in said container spaced above the concave bottom of the container, so as to define an elongated space below the false bottom;
an elongated gravel growing bed above the false bottom;

said false bottom including openings permitting solution movement both upwardly and downwardly between the space below the false bottom and the gravel growing bed above the false bottom;

an inlet/outlet port in a bottom portion of the container, communicating with the space below the false bottom;

means for introducing a water/nutrient solution through the inlet/outlet port into the space below the false bottom, in an amount sufficient to cause such water/nutrient solution to move upwardly through the openings in the false bottom into the gravel growing bed above the false bottom;

means for draining the water/nutrient solution from the gravel growing bed, through the openings in the false bottom, into the space below the false bottom, and then out through said inlet/outlet port, said false bottom being formed at least in part by a sheet of foraminous fabric material, said fabric material including means comprising openings of a size which allow water/nutrient solution to pass through but which block the plant roots, so that the false bottom will separate the plant roots from any pools of water/nutrient solution which may form on the concave bottom of the container following drainage of the water/nutrient solution out through the inlet/outlet port.

2. A growing bed according to claim 1, wherein the false bottom includes a strip of plastic material having side edge portions which contact opposite bottom side portions of the concave bottom of the growing bed, said material including openings therein which communicate the space below the false bottom with the space above the false bottom.

3. A growing bed according to claim 2, wherein the opposite edge portions of the plastic strip material are notched at spaced apart intervals and the notches provide the openings which connect the space below the false bottom with the space above the false bottom.

4. A growing bed according to claim 3, wherein the false bottom forming strip of material is convex at its top and concave at its bottom, so that no solution will pool on the central portion of the false bottom.

5. A growing bed according to claim 4, wherein said foraminous plastic material extends over the openings in the plastic strip material.

6. A growing bed according to claim 1, wherein the false bottom is convex at its top and concave at its bottom, so that no solution will puddle on the central portion of the false bottom.

7. A growing bed according to claim 6, wherein the openings are at the edges of the false bottom, where the false bottom meets bottom side portions of the container.

8. A growing bed according to claim 1, wherein the growing bed container is formed from a length of plastic tubing closed at its ends, and further comprising means for elevating such length of tubing comprising at least two spaced apart concrete building blocks set on end, each said building block including an upwardly directed end recess bounded by end portions of concrete, and wherein the tubing sets down into the recess and contacts the end portions of concrete and said end portions of concrete present rough edges in contact with the plastic pipe which effectively grip and hold the plastic pipe in place on the building block; and wherein the inlet/outlet port is located between the building blocks.

9. A growing bed according to claim 1, comprising a layer of gravel in the bottom portion of the container, and wherein said sheet of foraminous fabric material is sized to extend over said layer of gravel and having opposite edge portions which are secured to opposite bottom side portions of the container.

10. A method of growing plants, comprising:
providing an elongated, open top, growing bed container having a laterally concave bottom;
providing in said container an elongated false bottom spaced above the concave bottom of the container, so as to define an elongated space below the false bottom;
providing an elongated gravel growing bed above the false bottom;
providing in the false bottom openings for solution flow between the space below the false bottom and the gravel growing bed above the false bottom;
providing an inlet/outlet port in a bottom portion of the container, communicating with the space below the false bottom;
placing plants in the gravel growing bed;
periodically introducing a water-nutrient solution through the inlet/outlet port, into the space below the false bottom, in an amount sufficient that such water/nutrient solution will flow upwardly through the openings in the false bottom and then upwardly through the gravel growing bed;
continuing the introduction of water/nutrient solution into the inlet/outlet until such solution rises in the gravel growing bed up to a predetermined level;
then discontinuing the introduction of water/nutrient solution;
then draining the water/nutrient solution which has been introduced into the gravel growing bed to drain out from the gravel growing bed, through the openings in the false bottom, through the space below the false bottom, and out through the inlet/outlet; and
providing additional openings in the false bottom by utilizing as a component of said bottom a sheet of foraminous fabric material which includes openings of a size which allow water/nutrient solution to pass through but which substantially block plant roots, so that the plant roots will be kept away from any pooling of solution which might occur in the region below the false bottom, following draining of the water/nutrient solution out from the gravel growing bed.

* * * * *